(12) United States Patent
Stickling

(10) Patent No.: US 7,310,573 B2
(45) Date of Patent: Dec. 18, 2007

(54) METHOD AND APPARATUS FOR ISOLATING AIRCRAFT EQUIPMENT

(75) Inventor: Bjorn Stickling, Mississauga (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 497 days.

(21) Appl. No.: 10/822,657

(22) Filed: Apr. 13, 2004

(65) Prior Publication Data

US 2005/0228549 A1    Oct. 13, 2005

(51) Int. Cl.
*G06F 21/00* (2006.01)

(52) U.S. Cl. .......................................... 701/3; 244/1 R

(58) Field of Classification Search .................... 701/3, 701/24, 36; 244/1 R; 455/431, 426.1, 456.4
See application file for complete search history.

(56) References Cited

U.S. PATENT DOCUMENTS

| 4,584,603 A | 4/1986 | Harrison |
| 4,833,476 A * | 5/1989 | Dutcher ....................... 342/351 |
| 4,866,515 A | 9/1989 | Tagawa et al. |
| 5,388,995 A | 2/1995 | Rudy, Jr. et al. |
| 5,670,742 A * | 9/1997 | Jones ........................... 174/384 |
| 5,835,127 A | 11/1998 | Booth et al. |
| 6,058,288 A | 5/2000 | Reed et al. |
| 6,249,913 B1 | 6/2001 | Galipeau et al. |
| 6,401,013 B1 | 6/2002 | McElreath |
| 6,456,822 B1 * | 9/2002 | Gofman et al. ................. 455/1 |
| 6,507,952 B1 | 1/2003 | Miller et al. |
| 6,512,921 B1 | 1/2003 | Hadinger |
| 6,580,915 B1 * | 6/2003 | Kroll ........................ 455/456.3 |
| 7,050,755 B2 * | 5/2006 | Kline ............................. 455/1 |
| 7,127,683 B2 * | 10/2006 | Royalty ....................... 715/781 |

\* cited by examiner

*Primary Examiner*—Dalena Tran
(74) *Attorney, Agent, or Firm*—Ogilvy Renault LLP

(57) ABSTRACT

A system and method for interfacing equipment with flight Aircraft Equipment without causing interference between same. An isolation module includes transmission and power control functionality for ensuring safe and secure operation of the equipment on the aircraft.

35 Claims, 3 Drawing Sheets

METHOD AND APPARATUS FOR ISOLATING AIRCRAFT EQUIPMENT

FIELD OF THE INVENTION

The invention relates to the use of electrical and electronic equipment on board an aircraft, and in particular to a method and apparatus of employing equipment having various levels of certification.

BACKGROUND OF THE INVENTION

Government regulation requires all aircraft equipment to be certified prior to in-flight use to ensure compatibility of equipment and safety of flight. Equipment is classified as 'flight critical' or 'non-critical', where the level of certification depends on the criticality of that component to safe flight. Consumer and industrial grade devices, such as laptop computers and other electronics, are often desirable for in-flight use with the aircraft systems for a variety or uses, however, such equipment, normally cannot be inexpensively certified for aircraft use. This is because this unshielded equipment can, for example, induce damaging electromagnetism into the aircraft wiring by acting as an antenna to high intensity radio frequencies (HIRF) or lightning (even when such equipment is not switched on), or can interfere with on-board equipment by emitting radio and/or electromagnetic interference (EMI). Heavy shielding is therefore required, and certification requirements thus reduce the ease with which such equipment may be introduced to the aircraft. U.S. Pat. No. 6,401,013 proposes providing a specially-designed, shielded housing to permit direct connection of a consumer laptop to cockpit systems, however, the solution lacks flexibility and is still expensive, since it requires special shielding and is adapted for use with a specific piece of equipment (a PC) for a specific purpose (connection to cockpit computers). Also, changing equipment requires modification, such as modified security measures suitable for the new device, which reduces interchangeability. Consequently, the problem of permitting relatively easy use of consumer and industrial grade equipment on an aircraft remains to be addressed.

SUMMARY OF THE INVENTION

Accordingly, it is an object of the present invention to provide a method and an apparatus to isolate certified aircraft equipment from potential harm caused by connected non-aircraft electronic devices.

According to a first broad aspect of the present invention, there is provided an apparatus for connecting aircraft-certified equipment and to other equipment of uncertain certification level, said apparatus comprising a communication link between the aircraft-certified equipment and the other equipment, an isolator in the communication link adapted to electrically isolate the aircraft-certified equipment from the other equipment, and a controller adapted to selectively interrupt communication between the aircraft-certified equipment and the other equipment.

In another embodiment of the invention, an apparatus for connecting aircraft data systems to non-aircraft data systems, the apparatus comprising a communication apparatus permitting data communication therethrough between at least one aircraft data system and at least one non-aircraft data system, and a control apparatus adapted to receive information from an aircraft-based source, the information indicative of at least one control parameter, wherein the control apparatus is adapted to initiate at least one control operation on the non-aircraft data system based on the received at least one control parameter.

According to another broad aspect of the present invention, there is provided a method of isolating flight-critical aircraft equipment and from other equipment connected thereto, the method comprising the steps of connecting the equipment to permit communication therebetween, automatically acquiring a signal indicative of an aircraft operational status, and automatically changing an operational status of the other equipment based on the aircraft operational status.

According to another broad aspect of the present invention, there is provided a method of employing consumer/industrial equipment in connection with aircraft equipment on board an aircraft, the method comprising the steps of providing an interface for data communication between the consumer/industrial equipment and the aircraft equipment, and automatically controlling the consumer/industrial equipment with at least one input received from the aircraft equipment, wherein said controlling includes at least one of interrupting data transmission from the consumer/industrial equipment to the aircraft equipment and interrupting power provided to the consumer/industrial equipment.

BRIEF DESCRIPTION OF THE DRAWINGS

These and other features, aspects and advantages of the present invention will become better understood with regard to the following description and accompanying drawings wherein.

DETAILED DESCRIPTION OF THE INVENTION

The present invention provides an isolation system and method adapted to permit safe and cost-effective communication between aircraft electronic equipment having a high-level certification requirement due to its criticality to flight (e.g. engine and/or flight control systems, etc.) and other electronic equipment on-board the aircraft. The terms "certified" and "high-level certified" are used in this application to refer to equipment which has been certified to comply with the standards of operational safety set by an appropriate governmental body (e.g. the Federal Aviation Administration or FAA), and is thereby deemed safe for use in flight in conjunction with flight critical systems. Such equipment will for convenience be referred to as "Aircraft Equipment". The term "Other Equipment" is used in this application to refer to any electronic equipment having in-flight connection with the aircraft or the Aircraft Equipment, regardless of certification level of such other equipment. Examples of Other Equipment may include personal and/or industrial-grade computers, personal digital assistants (PDAs), printers, facsimile machines, cellular telephones, etc. and may thus potentially be any commercially available or other product (i.e. having no special modification made in order to be used onboard aircraft). It is to be understood that the term "equipment" in this application is used loosely, and is intended to encompass hardware, software, etc.

Preferably, the invention provides one or more of the following functionality: (1) EMI isolation, preferably including at least surge, current and interference protection to the Aircraft Equipment from EMI, HIRF and lightning events that may affect the Other Equipment; (2) power level control, preferably permitting at least control the duty cycle of the Other Equipment so as to disable or partially disable the equipment in flight; and (3) data communication isolation and control, preferably which is at least capable of preventing commands from the Other Equipment from adversely affecting the Aircraft Equipment. The invention preferably additionally provides: (4) communication protocol conversion, preferably providing at least the capability to convert data signals to/from common commercial/industrial communication protocols to common aircraft protocols (e.g. UART 232-UART 422); (5) control of other features via external analog signals (e.g. voltage switches); and (6) communication and unit status and health information. A more detailed explanation of function and construction will now be provided with reference to the Figures.

Figure 1:
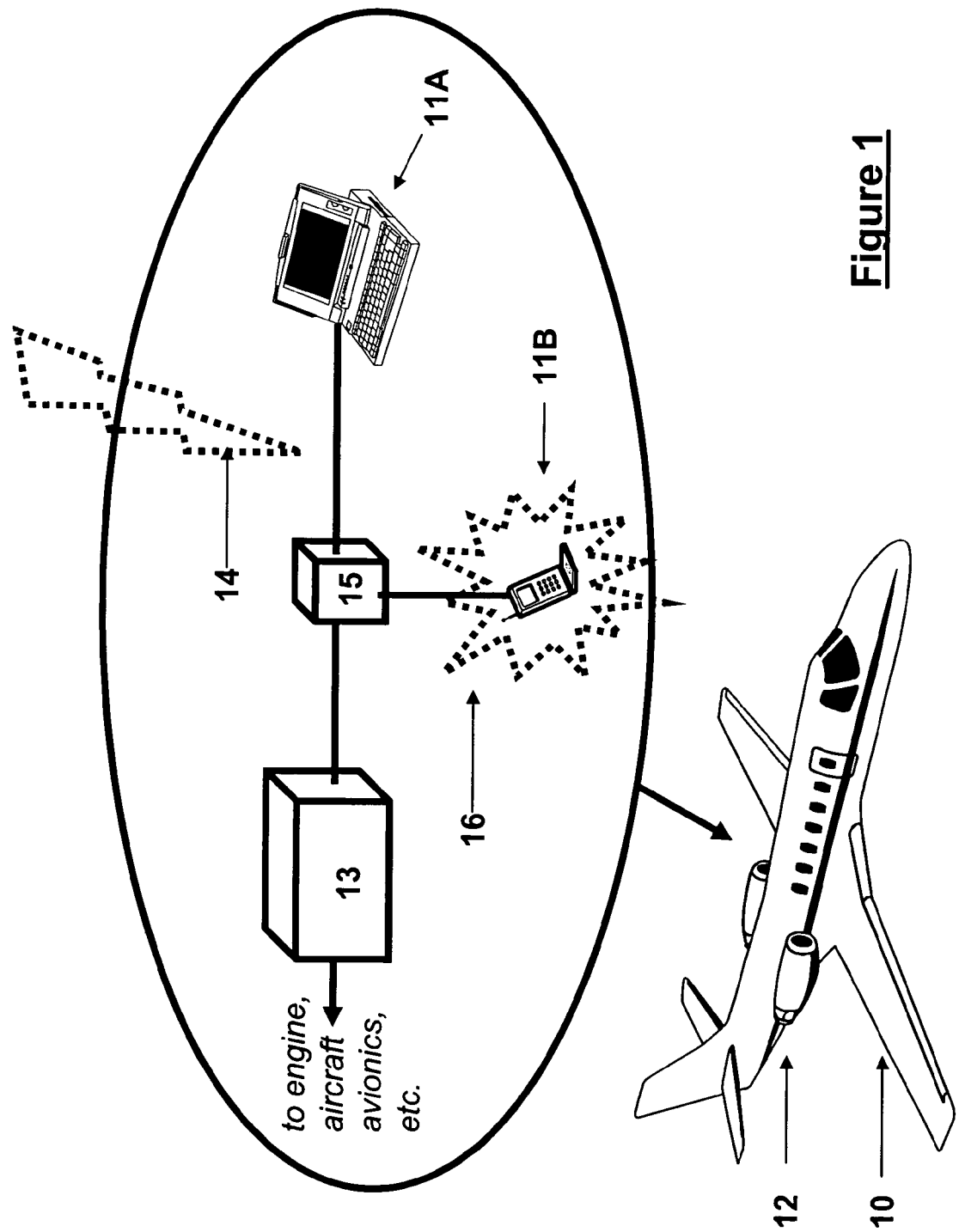
FIG. 1 is a schematic representation of an aircraft including an embodiment of the present invention.

Referring to FIG. 1, an aircraft 10 having engines 12 includes onboard systems 13, hereinafter referred to as Aircraft Equipment 13, connected to other preferably electronic equipment 11, hereinafter referred to as Other Equipment 11, via an isolation and control unit 15. Here, Other Equipment 11 comprises a computing device 11A and a wireless transmission device 11B. Examples of Aircraft Equipment 13 includes one or more of fully certified engine and/or flight control systems, such as electronic engine controllers (EEC) or full-authority digital engine controller (FADEC) and aircraft avionics. Examples of Other Equipment 11 includes one or more of commercially-available personal computers, servers and micro-servers, PDAs, printers, cellular and satellite telephones, wireless LAN devices, bar code scanners, facsimile machines, sensors, data acquisition units, monitoring equipment, diagnostic equipment, recording devices, entertainment or luxury devices and any other aircraft or non-aircraft electronics, computing or electrical devices, regardless of aircraft certification level. It must be understood, however, that the exact nature or character of the Aircraft Equipment 13 and the Other Equipment 11 forms no part of this invention.

As mentioned previously. Other Equipment 11 may be subject to potentially damaging external electromagnetic energy 14, such as lightning and high-intensity radiated fields (HIRF), and may itself generate electromagnetic energy 16, such the electromagnetic interference (EMI) generated by a consumer cell phone simply by reason of it operation. Isolation and control unit 15 is itself preferably fully shielded against EMI, HIRF and lightning, and preferably has full FM certification for "Zone 1" environmental conditions for commercial aircraft applications. Thus, preferably isolation and control unit 15 forms part of the "high level" certified systems of aircraft 10. Typically, isolation and control 15 would be incorporated into a suitable existing piece of certified equipment or housed in its own housing (not shown) that would allow for stand alone certification of the unit.

Figure 2:
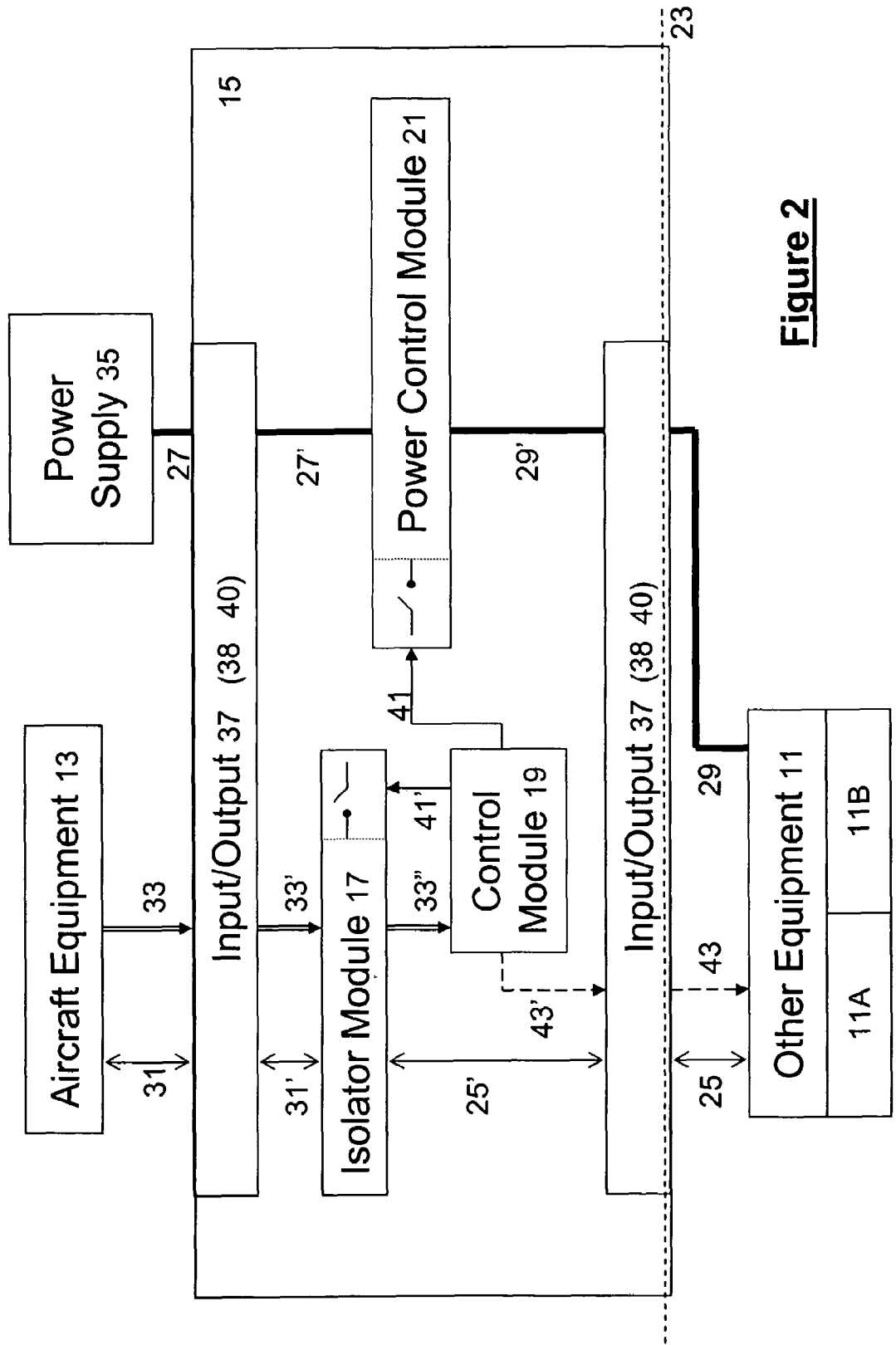
FIG. 2 is a block diagram of an embodiment of the present invention.

Referring now to FIG. 2, in a first embodiment the isolation and control unit 15 comprises an isolator module 17, a control module 19, a power control module 21, and input/output (I/O) bays 37. I/O bays 37 include both data transmission and power transmission connectors (not shown), as will be discussed in more detail below. Dashed line 23 symbolizes a notional interface between the Other Equipment 11 and the aircraft 10.

Isolation and control unit 15 is connected to the aircraft by a data bus 31 and control line 33, both connected Aircraft Equipment 13, in this case a gas turbine engine 13A. Internally to isolation and control unit 15, data bus 31' and control lines 33' and 33' are directed to isolator module 17 and control module 19, respectively. An aircraft-based power supply unit 35 is connected to power control module 21 in isolation and control unit 15 via a power line 27, I/O bay 37 and internal power line 27', respectively. Other Equipment 11, in this example a computer 11A and a wireless transmitter 11B for linking computer 11A to a ground-based network (not shown), is also connected to isolation and control unit 15 and, specifically, connected to isolator module 17 (via data bus 25, I/O bay 37 and internal data bus 25', respectively) for data communication and to power control module 21 (via power line 29, I/O bay 37 and internal power line 29' respectively) for receiving electrical power. Control module 19 provides a control link 41, 41', respectively, to power controls module 21 and isolator module 17.

EM Isolation: Isolation and control unit 15 preferably includes means for providing electromagnetic isolation to Aircraft Equipment 13 as will now be described. It will be noted that all data communication between Aircraft Equipment 13 and Other Equipment 11 passes through isolator module 17. Preferably, the isolator module 17 includes a data isolation circuit or device, with the inventor's preference being an optical isolator circuit or opto-electrical conversion module (not shown) such as the Hewlett Packard HCPL-2200. It will be understood that any suitable data transmission isolation device may be used, such as electromagnetic induction isolation, etc. although, as mentioned, preferably the isolation and control unit 15 is fully certifiable for aircraft in-flight use, and thus it is preferred that the isolation technique selected be capable of being fully certified for use as described herein. As will be understood by the skilled reader, an optical isolator, in essence, converts received electrical data signals into optical signals representing the same data, and then converts the optical signals back into electrical data signals for retransmission to the intended target. The interposition of such an isolator assists reducing or preventing the transmission of EMI and other interference through the data signal—here such isolation impedes interference cause by, or by the presence of, Other Equipment 11 from being transmitted to Aircraft Equipment 13. Safe and unaffected operation of Aircraft Equipment 13 is thus provided with a measure of protection against potential harm due to connection with Other Equipment 11, irrespective of the nature or certification level of Other Equipment 11.

Preferably, isolation and control unit 15 includes additional means 38 for preventing the transmission of high-energy EMI, HIRF, lightning, etc. from Other Equipment 11 to Aircraft Equipment 13. Such isolation may be provided through any suitable means, though the use of transient voltage suppressors, such as TransZorb™ (trademark of Vishay Semiconductors) brand suppressors, is preferred. These suppressors are preferably integrated into one or more I/O bays 37 (preferably both), though any suitable configuration within (or external to) isolation and control unit 15 may be used. Aircraft Equipment 13 is thereby provided with a quantifiable measure of protection against potential harm caused by the transmission of EMI, HIRF or lightning from Other Equipment 11, irrespective of the nature or certification level of Other Equipment 11. The provision of this quantifiable measure of protection, and its relative independence from the connected Other Equipment, thereby assists in facilitating certification of Other Equipment 11 for use with aircraft 10.

Power Control: Isolation and control unit 15 preferably includes means for providing isolation to Aircraft Equipment 13 and aircraft 10 from harmful effects caused by the mere operation of a piece of Other Equipment, as will now be described. As described above, for example, it is well understood that Other Equipment such as cellular telephones emit radiation that is locally intense and at a frequency and bandwidth which causes interference to Aircraft Equipment such as cockpit radios, etc. Therefore, isolation and control unit 15 also contains a power control module 21 for controlling the duty cycle of power to Other Equipment 11.

In one aspect of the preferred embodiment, electrical power to Other Equipment 11 is interrupted during all or certain portions of the aircraft operation cycle, to automatically turn the equipment "off". In one example, a control signal 33 is received by control module 19 from Aircraft Equipment 13 from which a threshold condition can be determined and used to set the power setting (on/off) provided to Other Equipment 11 via power control module 21. The control signal 33 may comprise one or more of an engine shaft speed signal (e.g. N2/NH, N1/NL, $N_{propeller}$, generator speed, etc.), an engine temperature (e.g. $T_{4-5}$ or inter-turbine temperature ITT, etc.), an engine pressure (e.g. oil or fuel pressure), an engine controller data flag indicating engine operation (i.e. from the EEC or FADEC), or an engine controller data flag specifically programmed for triggering power control module 21, an aircraft status signal (e.g. weight-on-wheels or WOW signal, aircraft speed, pressure altitude information, etc.) or other existing or specifically-acquired analog or digital information indicative of an aircraft or engine cycle status. One or more parameters may be used to determine, for example, if the engine(s) is running, the aircraft is moving, or taxiing, or off the ground, etc.

When such a signal is received via line 33 by control module 19, control module 19 sends a signal to power control module 21 to interrupt power transmitted via power line 27' to the Other Equipment 11. It will of course be understood that this description is intended to be conceptual and for teaching purposes only, and that the described functions of modules 19 and 21 may be integrated and thus, indistinct—for example, control signal 33 may itself simply trigger the opening of a switch in power control module 21. A multitude of other arrangements are also obviously available to achieve the described approach, and thus it is of little benefit to the skilled reader to describe all possible embodiments here.

For redundancy, preferably two control signals 33 are sent to isolation and Control module 15. Also, preferably two control mechanisms are used. For example, an engine controller "disconnect" signal is used, to activate power control module 21 to disconnect power when the engine controller "decides" that disconnection is appropriate, and the engine high pressure turbine shaft speed (N2) is used to activate power control module 21 to disconnect power to Other Equipment 11 when a certain N2 threshold is met (e.g. indicative of engine operation, or engine run-up, etc.).

Referring still to FIG. 2, a manual power-cut override switch (not shown) may also be provided to permit manual activation of power control module 21. As indicated by dotted lines 43 and 43', control may also be achieved directly between control module 19 and Other Equipment 11, wherein control module 19 directly triggers an appropriate response in Other Equipment 11.

The described technique may be used to selectively de-power equipment as desired. For example, in FIG. 2, the laptop computer 11A may be permitted to operate during aircraft flight, whereas the wireless transmitter 11B is automatically de-powered on engine start-up and permitted to re-power after landing as the aircraft taxis towards the apron, terminal building, etc. Alternately, in certain circumstances, rather than entirely interrupt a power supply to a particular Other Equipment device, the present invention may be employed to selectively reduce, increase or otherwise alter the electrical power provided to Other Equipment 11 as desired to achieve operational and/or certification requirements. Optionally, the present power control technique may also be used with Other Equipment 11 which does not pose serious in-flight risks to Aircraft Equipment 13, but rather use of the present power control approach is maintained simply to facilitate certification of such Other Equipment for aircraft use.

The power control aspect of the present invention therefore provides a method of controlling the duty cycle of Other Equipment 11 so as to provide the aircraft and aircraft equipment with a quantifiable measure of protection against potential harm merely caused by operation of Other Equipment 11 during flight, irrespective of the nature or certification level of Other Equipment 11. The provision of this quantifiable measure of protection, its relative independence from the connected Other Equipment, and the provision for control of Other Equipment 11 by Aircraft Equipment 13, each thereby assists in facilitating certification of Other Equipment 11 for use with aircraft 10.

Data Communication Isolation: Isolation and control unit 15 preferably includes means for providing data transmission isolation to Aircraft Equipment 13 as will now be described. It is of course well-understood that data communication between electronic equipment typically consists of each device both transmitting and receiving information through communication lines—i.e. the devices typically both "talk" and "listen" to each other. The present invention, however, includes means for selectively interrupting data communication from (i.e. the "talk" from) the Other Equipment 11 to the Aircraft Equipment 13, to minimize the possibility that such data transmission will have an undesirable effect on the operation on Aircraft Equipment 13.

Control of data transmission may be achieved in any suitable manner. Options to be discussed below include single threshold interruption of data lines and more intelligent means for monitoring and control, though it will be appreciated that the system and method of this aspect of the present invention may be implemented in a variety of ways, according to design choice.

In a first aspect, control is achieved through selectively interrupting data transmission from Other Equipment 11 to Aircraft Equipment 13. Thus, when a control criterion is satisfied, data received by unit 15 from Other Equipment 11 is not transmitted to Aircraft Equipment 13, but data communication to Other Equipment 11 is preferably continuously permitted. Hence, in this "interrupted" mode, the Other Equipment may not "talk" to, but may only "listen" to, Aircraft Equipment 13.

Referring still to FIG. 2, preferably such control is achieved in a manner similar to the operation of power control module 21, described above. Namely, Aircraft Equipment 13 provides a control signal via control line 33 from which a threshold condition can be determined and used in interrupting data transmission from Other Equipment 11 to Aircraft Equipment 13. For example, in one possible design, a signal from Aircraft Equipment 13 of the type described above in respect of power control module 21 (e.g., an engine or aircraft speed, pressure or other signal) is received by control module 19, from which it is determined whether a threshold condition exists, upon which a signal is provided via line 41' to isolator module 17 for interruption of data transmission. A simple switch-like interruption is preferred, such as provided by selectively de-powering an appropriate transmission opt-isolator in module 17. Data interruption may occur at any suitable place inside or outside isolation and control module 15 (inside being preferred), and in any suitable manner. As indicated by dotted lines 43 and 43', control may also be achieved directly between control module 19 and Other Equipment 11, wherein control module 19 directly triggers an appropriate response in Other Equipment 11.

This simple technique only permits Other Equipment 11 to "listen" to the data bus, and makes it physically impossible (when operating correctly) for Other Equipment 11 to send data to Aircraft Equipment 13 until such time as the control technique permits it. Often, "listening" is the most desired aspect of communication in any event, as what is truly sought is merely the transmission of data from Aircraft Equipment 13 to Other Equipment 11, for the purpose of data logging, data monitoring, further processing and/or off-aircraft transmission. Hence, this control scheme is in fact relatively unintrusive, if at all, on the effective use of Other Equipment 11.

Figure 3:
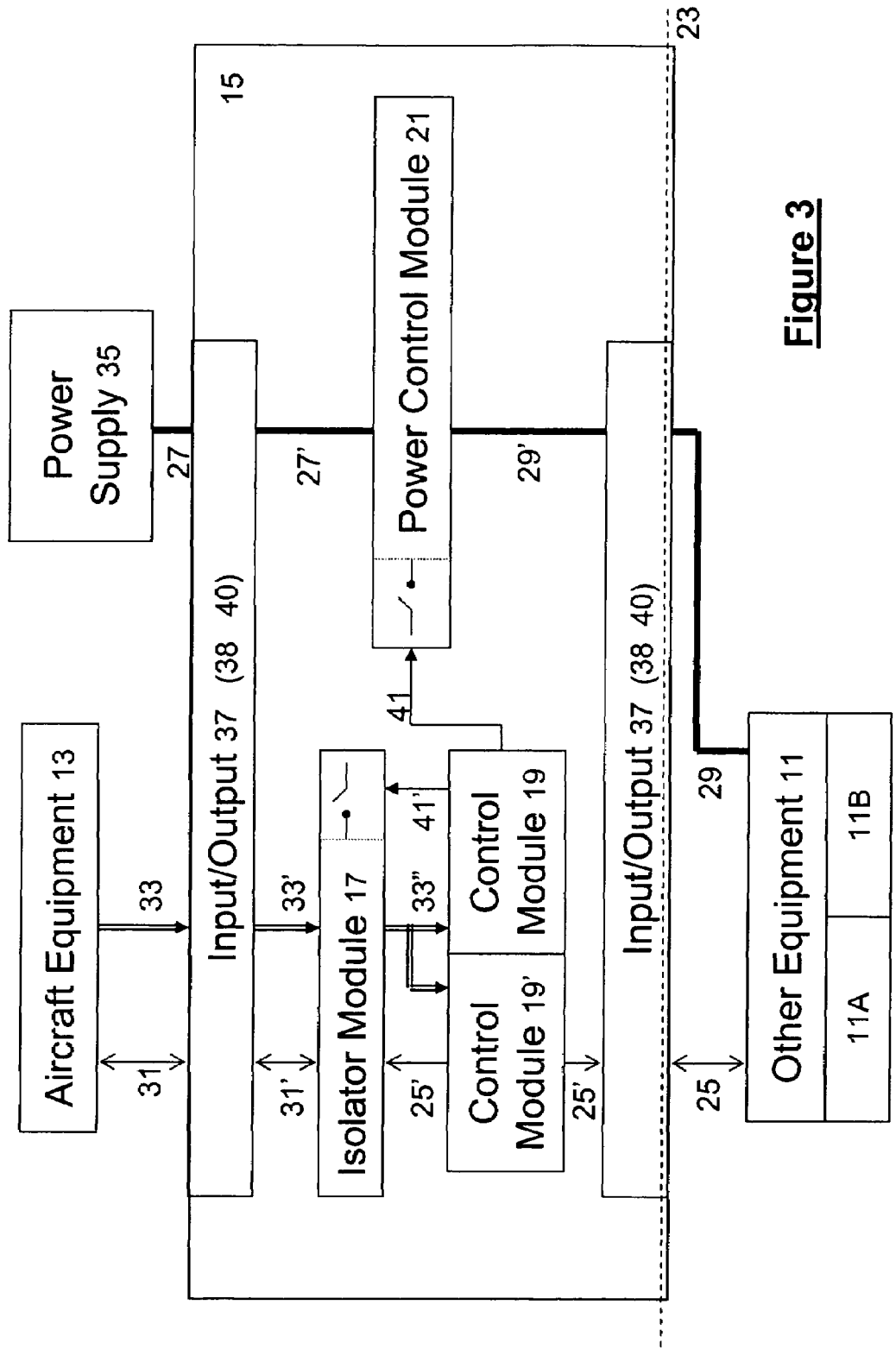
FIG. 3 is a block diagram of another embodiment of the present invention.

In another embodiment demonstrated in FIG. 3, control module 19' acts as a filter or data "firewall", monitoring all data transmitted from Other Equipment 11 to Aircraft Equipment 13, and selectively blocking data which is deemed to be potentially disruptive, damaging or malicious (such as a computer hacker attack, should Other Equipment 11, for example, include connection to a network such as the Internet.). Control module 19' may implement any desired security rules, may be software, hardware or any other implementation, and may also receive a control input from Aircraft Equipment 13 via control line 33/33'/33", and hence permit multi-parameter filtering of transmitted data. For example, in-flight security rules may be much stricter than on-ground rules, and may in fact amount to a complete disruption of data transmission from Other Equipment 11 to Aircraft Equipment 13. Filtering rules may also be tailored to the type of connected Other Equipment A manual override input device (not shown) is also preferably provided to override the operation of module 19'.

Therefore, selection of one or more of the above features of this transmission control aspect of the invention thereby provides Aircraft Equipment 13 with a quantifiable measure of protection against potential harm caused by intentional, unintentional, malicious or other data transmission from Other Equipment 11, irrespective of the nature or certification level of Other Equipment 11. The provision of this quantifiable measure of protection, its relative independence from the connected Other Equipment, and the provision for control of Other Equipment 11 by Aircraft Equipment 13, each thereby assists in facilitating certification of Other Equipment 11 for use with aircraft 10.

Protocol Conversion: Referring again to FIG. 2, isolation and control unit 15 may also be provided with additional features which increase convenience and functionality. For example, as aircraft electronic equipment typically employs communication protocols, such as ARINC429 and UART422, which are incompatible with protocols employed by consumer and industrial electronic equipment, such as UART 232 and USB, I/O connector bays preferably also include intrinsic protocol conversion 40 in isolation and control unit 15, such that both types of devices may be directly connected to isolation and control unit 15 without further processing or conversion. Also, I/O bays preferably include apparatus for sending and receiving signals of various types, such as traditional cable connectors, optical signals, radio-frequency (RF) signals and/or infra-red (IR) signals. By providing intrinsic protocol conversion in isolation and control unit 15, once isolation and control unit 15 is certified for use on the aircraft, this greatly facilitates certification of Other Equipment 11 not employing typical aircraft data protocols.

Operation: As mentioned above, isolation and control unit 15 is provided with, and thus certified with, the Aircraft Equipment 13 on aircraft 10. In other words, the step of certifying the isolation and control unit 15 may be performed at the time of aircraft certification, with the isolation and control unit 15 provided as integral equipment offered on aircraft 10, with only interface 23 and the associated I/O connector bay 37 all that is readily visible to a person on-board aircraft 10. At some later time, when a piece of Other Equipment is desired for use with aircraft 10, certification of such equipment is made easier by the presence of isolation and control unit 15, since the potential damaging effects of Other Equipment 11 on aircraft 10 are greatly mitigated, and mitigated in a quantifiable fashion which facilitates quicker and cheaper certification.

Once such Other Equipment is certified for use with aircraft 10, operation is as follows: in use, one or more pieces of Other Equipment 11 are connected appropriately to the so-presented I/O connector bay 37 of isolation and control unit 15, for data communication with the Aircraft Equipment 13 and for power connection communication with power supply 35. Preferably, isolation and control unit 15 includes appropriate the protocols and connection conversion means to permit a simple direct connection of the Other Equipment 11 to the aircraft.

Data transmission to and from Aircraft Equipment 13 is isolated by isolator module 17 and transient voltage protection is also provided. Upon satisfaction of threshold conditions (e.g. engine operation, manual input, exceedance of security rules, etc.) data transfer from Other Equipment 11 to Aircraft Equipment 13 is interrupted or filtered to prevent interference with operation of Aircraft Equipment 13. Also, upon satisfaction of the same or different criteria, electrical power supplied to some or all of Other Equipment 11 is modified or interrupted to deactivate operation of such equipment. In both cases, the Aircraft Equipment 13 itself may determine when such thresholds should be triggered, and thus the aircraft equipment is given a measure of control over the connected equipment. Preferred thresholds include monitoring engine N2 speed to determine when aircraft motion has begun, and thus interrupting power to equipment such as cell phones and wireless transmitters, and all data communication to the aircraft equipment. Upon aircraft landing, a WOW signal and an indicated airspeed may be used to determine when the aircraft has left the runway, and is taxiing towards the apron/terminal, such that data transmission and equipment power may be re-enabled, for example to permit transmission of engine data via the wireless transmitter to a base-station portal to a network such as the Internet.

The invention, therefore provides a system and method for facilitating the use of consumer electronics, etc. safely with aircraft systems. Thus, as consumer technologies ever more rapidly develop update of associated on-board systems will be simpler and less expensive, thereby giving the potential to enhance the experiences and satisfaction of aircraft owner, operator, pilot, passenger and maintenance personnel alike.

From a certification perspective, aviation regulatory authorities generally prefer simple, reliable devices which provide fail-safe performance. The present invention provides a relatively 'low-tech' (if desired) solution for protecting aircraft systems form non-aircraft systems, irrespective or the nature or certification level of the non-aircraft system. Unlike the prior art, the present invention permits the non-aircraft systems to be externally controlled according to desired rules to reduce the impact of these systems on aircraft systems. Further, the invention permits the aircraft systems to provide or initiate such control rules, and thus prevents a certifiable system which provides non-aircraft systems access to flight-critical aircraft systems. Furthermore, the so-called security measures provided by the present invention need not be non-aircraft device specific, but can be applied to any such device. The simple yet effective manners in which control may be exerted in the present invention give the device of the present invention a universality which is absent in the prior art.

While the Figures illustrate block diagrams as groups of discrete components communicating with each other via distinct data signal connections, it will be understood by those skilled in the invention may be provided by any suitable combination of hardware and software components, with some components being implemented by a given function or operation of a hardware or software system, and many of the data paths illustrated being implemented by data communication within a computer application or operating system. The structure illustrated is thus provided for efficiency of teaching the functional aspects of the invention, it being understood that the manner in which the functional elements may be embodied is diverse. In many instances, one line of communication or one associated device is shown for simplicity in teaching, when in practice many of such elements are likely to be present.

It will therefore be understood that numerous modifications to the described embodiment will be apparent to those skilled in the art which do not depart from the scope of the invention described herein. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. An apparatus for connecting aircraft-certified equipment and to other equipment of uncertain certification level, said apparatus comprising:
    a communication link between the aircraft-certified equipment and the other equipment;
    an isolator in the communication link adapted to electromagnetically isolate the aircraft-certified equipment from the other equipment; and
    a controller adapted to selectively interrupt communication between the aircraft-certified equipment and the other equipment.

2. The apparatus of claim 1 wherein the controller selectively interrupts communication by at least one of modifying a power level of electrical power supplied to the other equipment, interrupting at least a portion of the data communication link, blocking at least a portion of a data flow between the aircraft-certified equipment and the other equipment, and providing a command to the other equipment.

3. The apparatus of claim 1 wherein the controller is adapted to selectively re-permit communication after communication has been interrupted.

4. The apparatus of claim 1 wherein the controller selectively interrupts communication from the other equipment to the aircraft-certified equipment but substantially permits continued communication from the aircraft-certified equipment to the other equipment.

5. The apparatus of claim 1 wherein the apparatus is adapted to provide electrical power to the other equipment from an aircraft-based source of electrical power to which the apparatus is connected, and where the controller is adapted to selectively interrupt said electrical power.

6. The apparatus of claim 1 wherein the controller is activated based on an automatically-acquired input indicative of a operational status of at least one of an aircraft, an aircraft-based system, an aircraft engine, an aircraft engine system and the aircraft-certified equipment.

7. The apparatus of claim 6, wherein the input is acquired from the aircraft-certified equipment.

8. The apparatus of claim 7, wherein the input is acquired from an aircraft engine controller.

9. The apparatus of claim 6, wherein the input is indicative of flight cycle status, and wherein the other equipment includes unshielded equipment which interferes with safe aircraft operation when used, and wherein the controller interrupts communication by de-powering the unshielded other equipment when the input indicates the flight cycle has commenced.

10. The apparatus of claim 1, wherein the controller comprises at least two independent controllers.

11. The apparatus of claim 10, wherein the at least two independent controllers are responsive to different control inputs.

12. The apparatus of claim 1, wherein the aircraft-certified equipment is flight-critical.

13. The apparatus of claim 12, wherein the aircraft-certified equipment includes at least one of an aircraft engine control system and an aircraft flight control system.

14. The apparatus of claim 1, wherein the apparatus is adapted to isolate the aircraft-certified equipment from transient voltages transmitted to the apparatus by the other equipment.

15. The apparatus of claim 1, wherein the other equipment is adapted for communication with the Internet.

16. The apparatus of claim 1, wherein said interruption is temporary, and wherein a duration of said interruption is determined by the controller.

17. The apparatus of claim 1 further comprising intrinsic protocol conversion between aircraft protocols and consumer electronic protocols.

18. An apparatus for connecting aircraft data systems to non-aircraft data systems, the apparatus comprising:
    a communication apparatus permitting data communication therethrough between at least one aircraft data system and at least one non-aircraft data system; and
    a control apparatus adapted to receive information from an aircraft-based source, the information indicative of at least one control parameter, wherein the control apparatus is adapted to initiate at least one control operation on the non-aircraft data system based on the received at least one control parameter.

19. The apparatus of claim 18, wherein the at least one control operation is selected from the group of at least partially interrupting said data communication, modifying said data communication, interrupting electrical power supplied to the non-aircraft data system and modifying electrical power supplied to the non-aircraft data system.

20. The apparatus of claim 19, wherein at least partially interrupting said data communication includes permitting continued communication from the aircraft data system to the non-aircraft data system.

21. The apparatus of claim 18, wherein the at least one aircraft data system is flight-critical.

22. The apparatus of claim 18, wherein the at least one aircraft data system is selected from the group comprising an aircraft engine controller and an aircraft avionics system.

23. The apparatus of claim 18, wherein the at least one control operation is non-specific to the non-aircraft data system.

24. The apparatus of claim 18, wherein the at least one non-aircraft data system primarily adapted for ground-based use, and wherein the device is substantially a commercially-available consumer data system.

25. The apparatus of claim 18, wherein the at least one non-aircraft data system uncertified for aircraft in-flight use.

26. The apparatus of claim 18, wherein the at least one non-aircraft data system is substantially electromagnetically unshielded relative to the aircraft data system.

27. The apparatus of claim 18, comprising a portion of a certified aircraft system, and wherein the non-aircraft data system is an electronic device.

28. The apparatus of claim 27 further comprising intrinsic protocol conversion between aircraft protocols and consumer electronic protocols.

29. The apparatus of claim 18, wherein the communication apparatus includes an isolation apparatus for electromagnetically isolating the aircraft data system and non-aircraft data system.

30. A method of isolating flight-critical aircraft equipment and from other equipment connected thereto, the method comprising the steps of:

connecting the equipment to permit communication therebetween;

automatically acquiring a signal indicative of an aircraft operational status;

automatically changing an operational status of the other equipment based on the automatically acquired signal indicative of the aircraft operational status.

31. The method of claim 30 wherein the step of changing the operational status of the other equipment includes reducing power supplied to the other equipment.

32. The method of claim 30, wherein the step of changing the operational status of the other equipment includes interrupting data transmission from the other equipment to the aircraft equipment.

33. The method of claim 30, wherein the signal is acquired from an aircraft engine and is indicative of an engine operational status.

34. The method of claim 30, wherein the signal is acquired from an aircraft sensor and is indicative of an aircraft operational status.

35. A method of employing consumer/industrial equipment in connection with aircraft equipment on board an aircraft, the method comprising the steps of:

providing an interface for data communication between the consumer/industrial equipment and the aircraft equipment, automatically controlling the consumer/industrial equipment with at least one input received from the aircraft equipment and indicative of an operational status, wherein said controlling includes at least one of interrupting data transmission from the consumer/industrial equipment to the aircraft equipment and interrupting power provided to the consumer/industrial equipment.

* * * * *